United States Patent

[11] 3,612,971

| [72] | Inventors | Felix Blaschke;<br>Herbert Ripperger, both of Erlangen,<br>Germany |
|---|---|---|
| [21] | Appl. No. | 853,356 |
| [22] | Filed | Aug. 27, 1969 |
| [45] | Patented | Oct. 12, 1971 |
| [73] | Assignee | Siemens Aktiengesellschaft<br>Berlin and Munich, Germany |
| [32] | Priority | Sept. 2, 1968 |
| [33] | | Switzerland |
| [31] | | 13151/68 |

[54] STATIC CONVERTER WITH DC INTERMEDIATE CIRCUIT FOR CONTROLLING THE SPEED OF A THREE PHASE MOTOR
4 Claims, 4 Drawing Figs.

[52] U.S. Cl. ..................................................... 318/227,
318/230
[51] Int. Cl. ..................................................... H02d 5/40

[50] Field of Search............................................ 318/138,
227, 230

[56] References Cited
UNITED STATES PATENTS
| 3,344,326 | 9/1967 | Risberg ......................... | 318/230 |
| 3,444,451 | 5/1969 | Schlabach et al............. | 318/227 |

Primary Examiner—Gene Z. Rubinson
Attorneys—Curt M. Avery, Arthur E. Wilfond, Herbert L. Lerner and Daniel J. Tick ABSTRACT: A first controllable converter is connected to an electrical power supply source. A second controllable converter is connected to a three-phase electric motor having stator windings impressed by preenergizing current. At least one smoothing choke for controlling the speed of the motor is connected at one end to the first converter and at the other end to the second converter. A control circuit causes the voltage at the one end of the choke to follow the voltage at the other end of the choke.

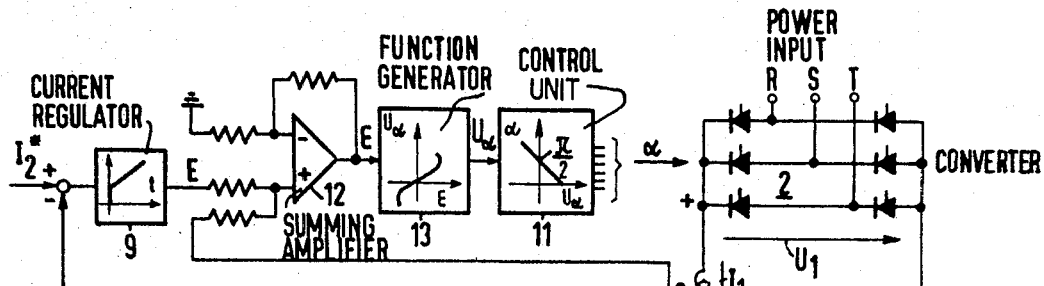
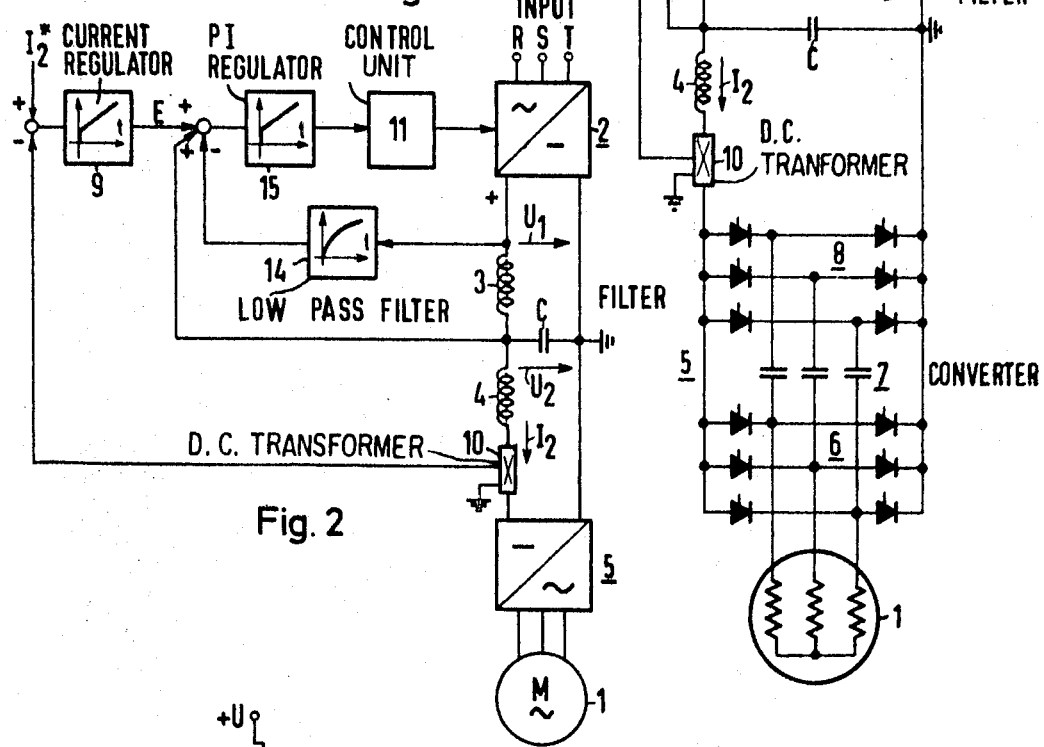
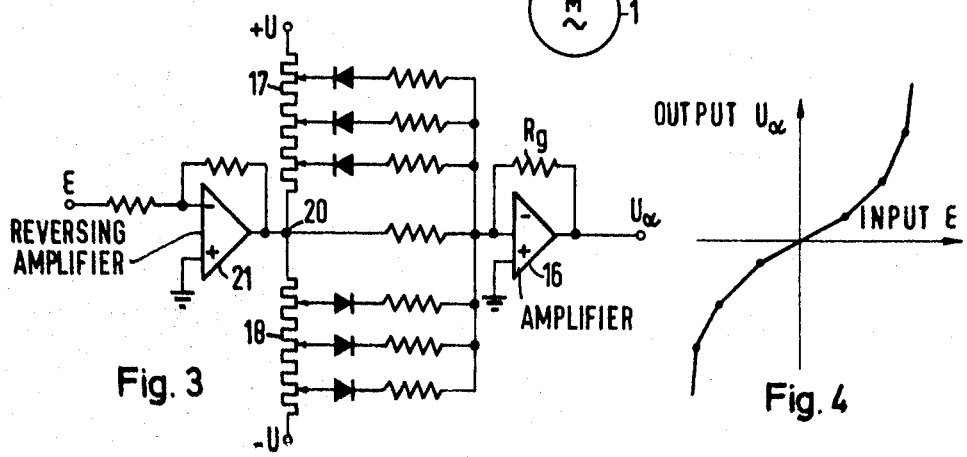

STATIC CONVERTER WITH DC INTERMEDIATE CIRCUIT FOR CONTROLLING THE SPEED OF A THREE PHASE MOTOR

DESCRIPTION OF THE INVENTION

The present invention relates to a three-phase motor speed-control circuit. More particularly, the invention relates to a static converter with a DC intermediate circuit for controlling the speed of a three-phase motor.

Our invention relates to a static converter with a DC intermediate circuit fed by a controllable current converter and comprising at least one smoothing choke. The DC intermediate circuit controls the speed of a three-phase motor. The stator windings of the motor are impressed by preenergizing current. A converter drive of this type has previously been suggested, and affords the advantage that during a load change in the speed-controlled motor, that is, when there is a change from motor to generator operation, no special diodes are required for feedback into the power lines. Only the line-connected converter is to be controlled to change from rectifying to inverting operation.

The principle object of our invention is to provide a new and improved static converter with a DC intermediate circuit for controlling the speed of a three-phase motor.

An object of the invention is to provide for the impression of current on the stator windings of the speed-controlled motor in a particularly simple and rapid manner.

In accordance with our invention, the voltage at the end of the smoothing choke subordinated to the converter, which is adjacent the powerline, follows the voltage at its other end. Thus, the basic idea of the invention is to insure that the voltage difference at the choke will reliably disappear, virtually down to he voltage drop caused by its winding resistance, independently of the reactive effects of the current on the motor end of the choke. Due to the decoupling of the circuit portion which is connected in series with the smoothing choke, it assumes the characteristic of a reaction-free smoothing member, or, when the winding resistance is negligible, of an integrator which operates without reaction. Members operating without reaction have the characteristic that their current may be determined, that is, impressed, exclusively by their input parameters.

The followup setting of the input voltage of the choke to a value of its output voltage, may be effected in a very simple manner, in accordance with one embodiment of the invention, by impressing the choke output voltage additionally upon the control voltage which determines the electrical control or phase angle of the converter. According to another feature of our invention, it may be favorable to provide a function generator which precedes the control assembly of the converter in order to make the arithmetic median value of its output voltage linearly dependent upon the control voltage. This may provide, over substantially the entire control range of the converter, correspondence between the voltages occurring at both ends of the choke. The function generator may suitably comprise a known electronic amplifier having input and/or feedback circuits with biased threshold diodes.

For exacting requirements with respect to time constancy of the impression of the current with unaltered control voltages, another embodiment of the invention provides that the two voltages at the ends of the choke be subtractively supplied to the input circuit of a regulator which acts upon the control assembly. It is preferred that the regulator have an integral action.

In order that the present invention may be readily carried into effect, it will now be described with reference to the accompanying drawing, wherein:

FIG. 1 is a block and circuit diagram of an embodiment of the static converter of our invention;

FIG. 2 is a block and circuit diagram of another embodiment of the static converter of our invention;

FIG. 3 is a circuit diagram of an embodiment of a function generator which may be utilized as the function generator of the present invention; and FIG. 4 is a graphical presentation of the input-output characteristic of the function generator of FIG. 3.

FIG. 1 shows a converter drive for a three-phase motor 1 which, according to the invention, may be an induction motor or a synchronous motor. The phases R, S, T of a three-phase power line are connected to a controllable converter or rectifier 2, in three-phase bridge connection. A T-type filter is connected in the DC intermediate circuit for smoothing or filtering and comprises two smoothing chokes 3 and 4 and a smoothing capacitor C.

The DC intermediate circuit energizes a self-monitored rectifier 5, which comprises main thyristors 6 connected in a three-phase bridge circuit and commutation thyristors 8 connected in parallel with the main thyristors via commutation capacitors 7. The commutation capacitors 7 may be interconnected via the thyristors 6 and 8 and may be connected via an appropriate control with the corresponding phase windings of the motor 1, to form oscillatory circuits. This is done in order to produce the commutation voltages required for the quenching of the main thyristors 6, which commutation voltages are delivered to the capacitors 7 as charge voltages.

To impress the current for the converter or rectifier 5 on the motor end of the chokes 3 and 4, a current regulator 9 is provided which receives, as a datum value, a current magnitude $I^*_2$ and, as a pilot value, an input current magnitude $I_2$ of said converter or rectifier. The current $I_2$ is derived by means of a DC transformer 10. The output magnitude of the current regulator 9, indicated as E, determines the control angle $\alpha$ of the converter or rectifier 2 connected to the powerline end of the chokes 3 and 4. The control electrodes of the converter 2 are connected to the outputs of a control unit 11.

For rapid elimination of reactions upon the current $I_1$ of the smoothing choke 3, and thus also upon the current $I_2$ of the choke 4, due to possible variations of the countervoltage of the converter 5 or due to variations in the voltage $U_2$ at the smoothing capacitor C, the control voltage E and said voltage $U_2$ are added via a summing amplifier 12. The voltage $U_2$ is the voltage which is at the end of the smoothing choke 3 farthest from the converter 2. The coupling action of the voltage $U_2$ causes the current $I_1$ to be impressed via the smoothing choke 3, since said current depends only on the control voltage E and not on any variations in the countervoltage $U_2$. This is due to the fact that when the value of the control voltage E is unvaried, each variation in the countervoltage $U_2$ produces a variation of the same magnitude in the input voltage $U_1$ of the choke 3.

For smaller control ranges of the output voltage of the rectifier 2, the relation between the control angle $\alpha$ and its arithmetic average value is almost linear, so that it may be sufficient to permit the output of the summing amplifier 12 to act directly upon the control unit 11. If, on the other hand, a larger control range is considered, it becomes necessary to take into account the nonlinear relation between the control angle $\alpha$ and the arithmetic median value of the rectifier output voltage $U_1$. In the embodiment of FIG. 1, this is accomplished with the assistance of a function generator 13, which operates as an antidistortion device.

The function of the function generator 13, which is to be reproduced, is derived from the following considerations. If the control unit 11 has the relation shown in its block symbol between its input voltage $U_\alpha$ and a voltage proportional to the control angle $\alpha$ $$\alpha = \frac{\pi}{2} - \frac{U_\alpha}{K_1},$$

then the equation which applies for the arithmetic median value of the rectifier output voltage is $$\bar{U}_1 = \frac{1}{K_2} \cos \alpha,$$

wherein $K_1$ and $K_2$ are constants. The control unit 11 is provided in the interest of linearity, with the function generator 13 connected to the input of said control unit. The general equation of the function generator 13, which is the relation between its input magnitude $\epsilon$ and its output magnitude $U_\alpha$, is $$U_a = K_1 \text{ arc sine } \epsilon(K_2).$$

When the foregoing function is reproduced with accuracy, the sufficient input magnitude $\epsilon$ of the function generator 13 is, equal, in the entire control range of the rectifier 2, to the arithmetic median value of the output voltage of said rectifier 2.

In the embodiment of FIG. 2, the voltage $U_2$ of the smoothing capacitor C and the output voltage $U_1$ of the rectifier 2, which is smoothed by a low-pass filter 14, are subtracted from each other and the difference voltage is applied to the input of a PI regulator 15, which in turn is connected in the input of the control unit 11. The function generator 13 may be dispensed with in the embodiment of FIG. 2, since its function is assumed by the regulator 15 which also provides that, in analogy to the embodiment of FIG. 1, the output voltage of the rectifier 2 follows the value of the voltage $U_2$ of the smoothing capacitor C, in the sense of a regulating process.

The circuit comprising the components 11, 14 and 15 may be regarded as a linear control arrangement which is regulated to produce a strong proportionality between the control voltage E and the median value of the rectified voltage $U_1$. This is completely independent of the variations in the power supply voltage which act upon the operational voltage of the components 11 and 15, as well as upon the output voltage of the rectifier 2.

FIG. 3 illustrates an embodiment of the function generator 13 of FIG. 1. The function generator 13 of FIG. 1 comprises an electronic amplifier 16 having a feedback. A plurality of biased threshold diodes are connected in the input of the amplifier 16 in parallel with a plurality of step-by-step input resistors. One group of diodes is connected with their cathodes connected to the taps of a potentiometer 17, energized with a positive direct voltage +U. A second group of diodes is connected with their anodes connected to the taps of a potentiometer 18, energized by a negative direct voltage −U.

When the potential of a circuit point 20, issuing from zero or ground potential, varies in a positive direction, the threshold diodes connected to the potentiometer 18 are switched to their conductive condition in sequence and deliver additional input currents to the amplifier 16, via the input resistors connected in series with the corresponding diodes. The same is true for the threshold diodes connected to the potentiometer 17 and is effected when the potential of point 20 varies in a negative direction.

A reversing amplifier 21 is included in the function generator of FIG. 3. This results in the characteristic shown in FIG. 4, of the input magnitude $\epsilon$ and the output voltage $U_a$. The break points in the characteristic of FIG. 4 may be adjusted via the taps of the potentiometers 17 and 18 while the corresponding increase or rise of the characteristic is provided at said break points from the quotients of feedback resistance $R_g$ and the parallel resistance of all the input resistors of the amplifier 16.

Thus, with an appropriate number of biased threshold diodes, it is possible to obtain any desired approximation of the resulting break line to the desired function. It is also possible, of course, in an analogous manner, to arrange the threshold diodes in the feedback circuit of the amplifier 16, without changing anything in the basic mode of operation of the function generator.

It should be stressed that when the voltage followup is effected, in accordance with the invention, for rating the choke, the essential factor is only a sufficient smoothing of the harmonic current waves produced by the phase angle voltages of the rectifier 2. Otherwise, the harmonic waves produced by the rectifier or converter 5 would also have to be considered, and the choke would therefore have to be rated much higher.

The circuits utilized in each of the blocks of the drawing are well known in the art. Each of these blocks constitutes a circuit which is known in the art and which is commercially available. Thus, for example, the current regulator 9 is described on page 44, section II. 11, of the "Applications Manual for Computing Amplifiers for Modeling Measuring Manipulating & Much Else" by Philbrick Researches, Inc., 1966.

The DC transformer 10 is the Siemens type EL 2/249.01.

The control unit 11 may comprise that described in the article entitled "Modular Control Units for Thyristors" by Linden and Schreiner, on pages 270 to 273 of the Siemens Review, Aug. 1965. The control unit 11 may comprise the Siemens type ST 5 or ST 6.

The PI regulator 15 is described on page 44, section II. 11, of the aforedescribed "Applications Manual for Computing Amplifiers for Modelling Measuring Manipulating & Much Else".

The function generator 13 may comprise that described in the article entitled "Diode Function Generators" by Crump, on pages 594 to 598 of Wireless World, Dec. 1967.

While the invention has been described by means of specific examples and in specific embodiments, we do not wish to be limited thereto, for obvious modifications will occur to those skilled in the art without departing from the spirit and scope of the invention.

We claim:

1. A device for controlling the speed of a three-phase electric motor operated by an impressed stator current having an electrical power supply source, a converter comprising a first controllable converter on the side of the power supply source and a second controllable converter on the side of the motor, and a DC intermediate circuit including at least one smoothing choke having one end connected to said first converter and another end connected to said second converter, the other end of the smoothing choke having a voltage acting in a positive sense, said device comprising a current regulator for the intermediate circuit current which provides an output voltage; a control unit for providing a control voltage for the first and second converters; means for applying the output voltage of the current regulator to the control unit; and means for applying the voltage at the other end of the smoothing choke to the control unit.

2. A device as claimed in claim 1, wherein one end of the smoothing choke has a voltage, and further comprising a regulator connected between the current regulator and the control unit; and means for applying the voltage at the one end of the smoothing choke to the regulator in a feedback sense.

3. A device as claimed in claim 1, wherein the first converter provides an output voltage and has a control input, and further comprising a function generator connected in the control input of the first converter for linearizing the dependence of the arithmetic median value of the output voltage of said first converter upon the control voltage of the control unit, the function generator comprising an electronic amplifier having an input and an output, feedback path connected between the output and the input of the amplifier and a plurality of biased threshold diodes connected in one of the input and feedback path.

4. A device as claimed in claim 2, wherein the regulator connected between the current regulator and the control unit is a PI regulator.